United States Patent

Coltrinari et al.

[15] 3,647,361
[45] Mar. 7, 1972

[54] TWO-STAGE COUNTERCURRENT LEACHING PROCESS FOR THE RECOVERY OF PHOSPHATES, YTTRIUM AND RARE EARTH VALUES

[72] Inventors: Enzo L. Coltrinari; James K. Kindig, both of Arvada, Colo.

[73] Assignee: Molybdenum Corporation of America, New York, N.Y.

[22] Filed: Dec. 3, 1969

[21] Appl. No.: 881,742

[52] U.S. Cl. .................................23/18, 23/19 R, 23/22, 23/23, 23/24 R, 23/312 ME, 23/165, 23/105, 23/107
[51] Int. Cl. .......................................C22b 59/00
[58] Field of Search ..............23/15, 19, 18, 22, 23, 165 C, 23/107, 312 ME; 75/115, 121

[56] References Cited

UNITED STATES PATENTS

| | | | |
|---|---|---|---|
| 2,425,573 | 8/1947 | Soddy | 23/19 R X |
| 2,860,031 | 11/1958 | Grinstead | 23/15 W |
| 1,351,489 | 8/1920 | Ryan | 23/19 X |
| 2,849,286 | 8/1958 | Welt et al. | 23/19 X |

OTHER PUBLICATIONS

Shaw et al. " U.S. Atomic Energy Commission Report ISC-407," declassified Feb. 26, 1957, pp. 1, 8– 10, 22, 24– 26, 28, 30– 32.

*Primary Examiner*—Herbert T. Carter
*Attorney*—Morgan, Finnegan, Durham & Pine

[57] ABSTRACT

Phosphates and yttrium and rare earth metal values are recovered from solid materials, particularly phosphate ores or commercial concentrates and especially apatites, in a two-stage leaching process comprising a first extraction with an aqueous acid solution to remove part of the phosphate and a substantial part of the yttrium and a second extraction with stronger acid to remove the residual phosphate, yttrium and rare earth values, then recovering the products from the first and second extracts. The process is carried out in a countercurrent manner by using the aqueous acid solution from the second extraction, after partial removal of yttrium and rare earth values, in the first extraction.

7 Claims, 2 Drawing Figures

3,647,361

TWO-STAGE COUNTERCURRENT LEACHING PROCESS FOR THE RECOVERY OF PHOSPHATES, YTTRIUM AND RARE EARTH VALUES

This invention relates to the recovery of phosphates and metals from solid materials. More particularly, it concerns recovery of phosphates and yttrium and rare earth values from solids such as ores, commercial residues, and the like, especially, calcium phosphate, i.e., apatite, solids and particularly apatite-containing tailings from magnetite iron ore concentration plants.

Yttrium, a metal produced by the instant process, is valuable for a number of uses, for example, as a "getter" in vacuum tubes and in the production of yttrium hydride as a neutron moderator. The rare earths provided by this invention are primarily those of the lanthanide series, illustrative members of which are lanthanum, cerium, praseodymium, neodymium, samarium, europium, gadolinium, terbium, dysprosium, holmium, erbrium, thulium, ytterbium and lutetium. The various salts of the rare earths have different colors and are suitable as pigments. The forms of phosphates produced as products of the instant invention have a number of uses. For example, the reaction product with ammonia, diammonium phosphate, is an important fertilizer.

BACKGROUND OF THE INVENTION

The phosphate minerals, and especially apatite, are widespread and available, for example, in sedimentary rocks. One specific source of apatite comprises tailings from magnatite iron ore concentrating plants. This apatite contains yttrium and rare earth values in concentrations substantial enough to be of interest as a source of these elements if a commercially feasible recovery method could be provided. Apatite of this type, of course, also contains substantial quantities of phosphate which if it could be recovered economically would be valuable commercially, for example, as mentioned above, as a source of phosphoric acid or for ammonium phosphate fertilizers. A number of methods are known in the art to recover phosphates, yttrium and rare earth values from solid materials. However, for a variety of reasons, none of the obvious prior art methods appears to be technically or economically feasible for this type of apatite concentrate. A number of preliminary laboratory experiments indicated that relatively expensive methods such as acid treatment and ion exchange recovery or physical benefication methods were not preferred. A method of flotation concentration followed by acid leaching, however, did show promise. The use of acid treatment of solid materials as a first step to extract phosphates and metal values is a matter of common knowledge and experience. See, for example, the disclosure in U.S. Pat. No. 2,860,031. Moreover, superphosphate is conventionally produced on a very large scale by the leaching of phosphatic rock with sulfuric acid. As employed herein, the term "leaching" is intended to indicate that a fluid aqueous phase is employed to effect direct removal of metal value (or of a phosphate) from a solid substance. Since the most efficient of these processes utilize sulfuric acid to dissolve the phosphatic minerals, it is clear that in the selection of a commercial process the acid consumption and the price of sulfuric acid will be very important factors in the cost of recovery of the products. Furthermore, to maintain the consumption of reagents at the lowest possible level, and to keep the size of the equipment small with respect to the amount of solid material to be processed, consideration should also be given to concentrating the solid mineral before the recovery operation is begun. Techniques to prepare the mineral and to concentrate it are known in the art. For example, if it is desired to increase the amounts of phosphate and metal values in apatite, it is useful to subject the solid to crushing or grinding, to deslimting and to concentration, e.g., by flotation with a fatty acid, all in accordance with known techniques. As is mentioned hereinabove, the cost of sulfuric acid can be a substantial factor in the economics of the recovery process. If the means selected could employ less expensive acid, for example, the so-called black spent sulfuric acids from oil refinery operations, which are available at a substantially lower price than fresh sulfuric acid, this would be a very important contribution to the commercial feasibility of the process. Leaching of the phosphatic ore or commercial concentrates with sulfuric acid provides an extract containing dissolved phosphate, yttrium and rare earth values. A number of prior art methods are available to remove the metals from the extracts, among which one of the most important is solvent extraction, such as with mono- or di-octyl phosphate or orthophosphates. See U.S. Pat. Nos. 2,860,031; 2,955,913 and 3,167,402. It is also known that, if, as is necessary, an excess of ordinary commercial sulfuric acid is used to dissolve the phosphate, yttrium and rare earth values in apatite ores or concentrates, it is necessary to raise the pH of the extract with, for example, lime or limestone, before the extract is fed to the solvent extraction system, if yttrium is to be removed most effectively. In addition to the added cost of purchasing and handling lime or limestone, this step precipitates gypsum which must be removed from the solvent extraction feed in a clarifyer. If there could be provided a means to avoid adding limestone, a substantial advantage in process economics would result. It has now been found, surprisingly, that if the leaching process of the prior art is modified substantially, being run in two countercurrent stages, the need to add limestone to adjust the pH is obviated; the amount of strong sulfuric acid needed in the process is reduced; and recovery of yttrium and rare earth values at a higher pH can be achieved; moreover, impure, inexpensive sulfuric acid can be employed instead of expensive strong sulfuric acid and the amount of acid consumption in the process is significantly reduced.

It is accordingly an object of the present invention to provide an improved means to recover phosphates, yttrium and rare earth values from solid materials, including ores and concentrates.

It is a further object of the invention to provide an improved means to recover phosphates, yttrium and rare earth values from apatite minerals.

Still another object of this invention is to provide a means to recover phosphates, yttrium and rare earth values from apatite concentrations more economical in its use of sulfuric acid than heretofore.

Still another object of the instant invention is to provide an improved means to recover phosphate, yttrium and rare earth values from apatite, without the need to neutralize excess sulfuric acid with limestone.

DESCRIPTION OF THE INVENTION

The above valuable objects, and additional objects apparent to those skilled in the art from a consideration of the description herein, are easily achieved by practice of the present invention which is:

In a two-stage, countercurrent process for recovering phosphate, yttrium and rare earth metal values from a solid material, the steps comprising a. leaching said material with an aqueous solution containing dissolved phosphate and excess sulfuric acid in an amount sufficient to produce a first acid leach solution containing part of the phosphate and a substantial part of the yttrium values from said material and separating said first acid leach solution from the leached residue;

b. leaching the residue from step (a) with water and sulfuric acid in an amount sufficient to produce a low pH second acid leach liquor containing almost all of the residual phosphate, residual yttrium and rare earth values from said material and separating said second acid leach solution from the leached residue;

c. recovering a portion of the yttrium and rare earth values from low pH second acid leach liquor from step (b), so that during recycling of said second acid leach liquor into step (a), the solubility of the yttrium and rare earth salts will not be exceeded but the phosphate content of the solution will be raised to a level sufficient to permit economic extraction of the phosphate; and d. extracting the yttrium and rare earth values from the first acid leach liquor from step (a), dividing the extracted liquor and sending one portion for recovery of the contained phosphate and the other portion to the second stage leach, step (b).

A useful pH range for the first acid leach solution [step (a)] is from about 0.50 to about 1.0, and preferably about 0.7. This will provide for removal of a substantial part, i.e., more than about 50 percent by weight of the contained yttrium. A useful pH range for the "low pH second acid leach liquor" is from about 0.02 to about 0.25, and preferably about 0.05. "Recovery" in step (c) contemplates preferably a solvent-extraction technique, as will be described hereinafter.

Preferred features of this invention are:

A process wherein the solid material is an apatite concentrate.

A process wherein the solid material comprises apatite tailings from a magnetite iron ore concentration process which have been concentrated subsequently by flotation to contain by analysis about 15–25 percent $P_2O_5$ and about 0.25–1.5 percent yttrium.

A process wherein the sulfuric acid used in step (b) is an impure, black acid, containing organic residues formed by contacting petroleum fractions with substantially organic residue-free sulfuric acid.

A process according to the invention including the step of defluorinating the aqueous solution.

Another preferred process is one wherein the yttrium and rare earth values are recovered by solvent extraction from the separated acid leach solutions from steps (a) and (b).

Still another preferred process includes the step of splitting said aqueous, yttrium and rare earth extracted solution from the first and leach step (c) into two portions, using the first portion in step (a) and recovering the phosphate from the second portion.

Special mention is made of a particularly valuable embodiment of the invention which is a two-stage, countercurrent process for recovering phosphates, yttrium and rare earth values from a concentrated solid apatite material containing, by analysis about 20 percent $P_2O_5$, about 0.7 percent yttrium and about 3 percent total rare earths, all percentages by weight, comprising a. leaching said material with a solution containing dissolved phosphate and excess sulfuric acid at a temperature of from about 30° to about 35° C. to produce a first acid leach solution of pH 0.7 containing part of the phosphate and a substantial part of the yttrium values from said material, thickening and then separating said first acid leach solution from the leached residue;

b. leaching the thickened residue from step (a) with an aqueous solution containing sulfuric acid at a temperature of from about 30° to about 35° C. to produce a second, strong acid leach solution of pH about 0.05 containing the residual phosphate, yttrium and rare earth values, filtering said second acid leach solution from the leached residue and discarding said residue;

c. solvent-extracting a portion of the yttrium and rare earth values from the second, strong acid leach solution of step (b), defluorinating and recycling said solution into step (a); and d. solvent-extracting the yttrium and rare earth values from the first acid leach solution from step (b), dividing said solution into two extracted portions, and using the first portion as part of said aqueous solution in step (b) and recovering the phosphates from the second extracted portion.

As is mentioned above, the portion of yttrium and rare earth values removed during step (c) will be such that on recycle of extracted material into step (a) the solubility of yttrium and rare earth salts will not be exceeded although the phosphate content will be raised to a level justifying economic recovery, e.g., about 50 grams/liter or more.

When used herein and in the appended claims, the term "leaching" is used as defined above. The term "recovering" is used in its broadest sense—with respect to phosphate, recovery can be made in any art-recognized manner, e.g., concentration into a form of phosphoric acid or production of diammonium phosphate by reaction with ammonia followed by crystallization or granulation. Yttrium and rare earth values are "recovered," e.g., by ion exchange techniques, or, preferably, by liquid-liquid "solvent extraction" techniques in which the leach liquor is contacted with a solvent selective for the metal values which is immiscible with the liquor and which consists of a suitable amine or alkyl phosphate dissolved in an oil or hydrocarbon solvent. The two phases are separated and the metal values recovered from the organic phase, e.g., by the use of a mineral acid stripping operation. See the disclosure of U.S. Pat. No. 3,167,402. The term "black acid" contemplates a so-called waste sulfuric acid from petroleum refineries. This is a strong acid which contains organic residues (petroleum sulfonates) formed by contacting petroleum fractions with substantially organic residue-free sulfuric acid to sweeten them. The term "defluorinating" contemplates adding a reagent, such as a sodium salt, e.g., sodium nitrate, or sodium carbonate, or a calcium salt, e.g., calcium carbonate, to precipitate fluoride. Defluorination may be necessary when crystallization is not used, to produce a feed liquor of sufficient purity to yield, upon ammoniation and granulation, a satisfactory diammonium phosphate.

DESCRIPTION OF THE DRAWINGS

A more complete understanding of the present process will be understood from the following discussion with reference to the drawings in which.

Figure 1:
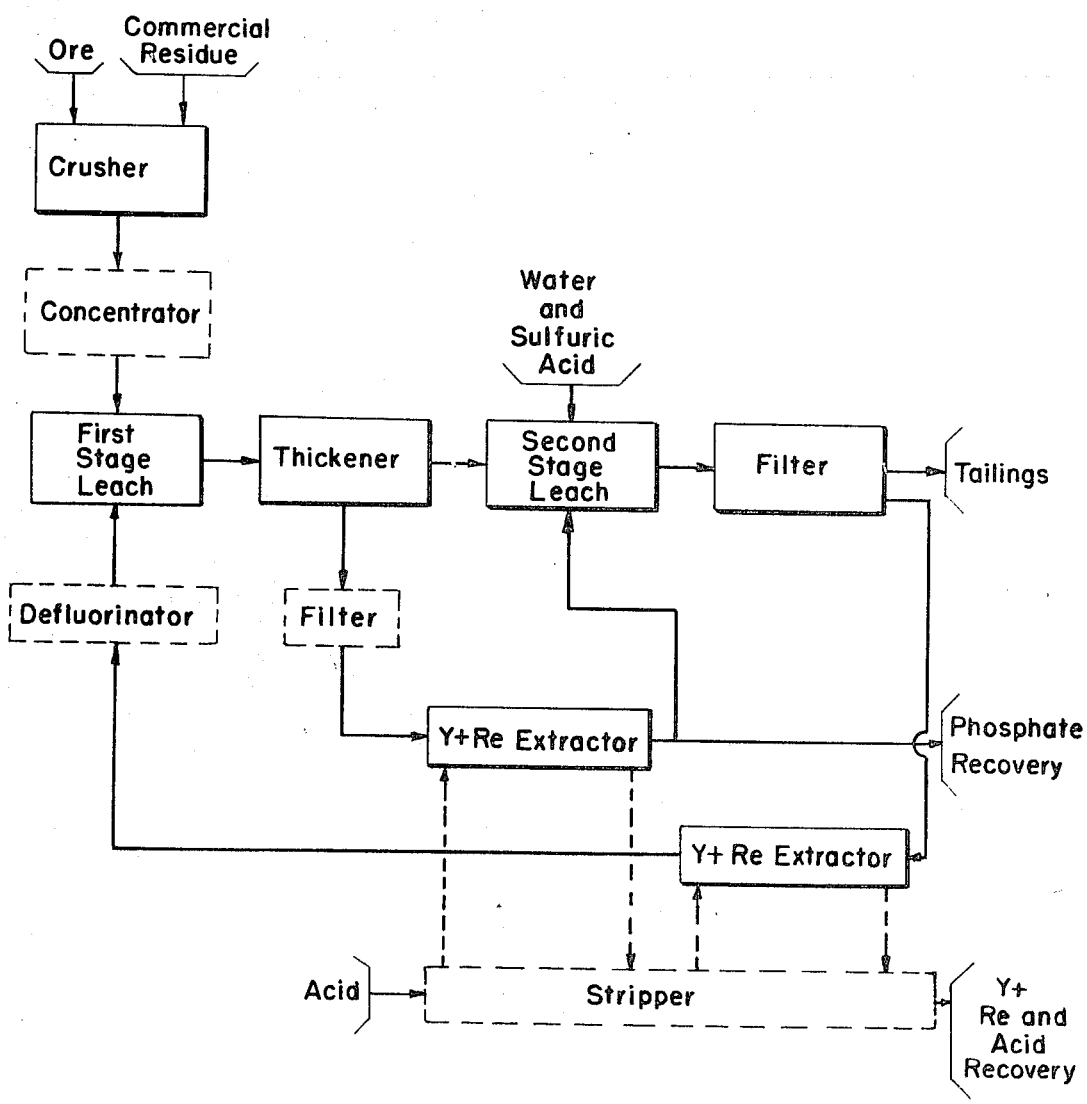
FIG. 1. is a flowsheet illustrating the process of the invention.

The process will be described broadly with reference to FIG. 1. The ore or commercial residue is first crushed or ground to the desired size and, optionally, may be concentrated, e.g., by flotation with fatty acid. Concentration can be useful with apatites from magnetite iron ore processing because these tailings contain usually only about 5–6 percent $P_2O_5$ and 0.2 percent Y. The crushed phosphate-containing material next is mixed in the FIRST STAGE LEACH with a solution containing dissolved phosphates and an excess of sulfuric acid. This solution is obtained from the SECOND STAGE LEACH passing it first through a first Y+RE EXTRACTOR and, optionally, through a defluorination step. This latter recycle is the countercurrent feature of this invention. After the material has been leached, the mixture is transferred to a THICKENER. The effluent portion of the slurry rich in phosphates and yttrium is separated, optionally clarified in a FILTER (the solids being returned to the FIRST STAGE LEACH) and, passed through a Y+RE EXTRACTOR and then a portion is processed to remove the phosphates therefrom. The solids from the THICKENER are transferred to the SECOND STAGE LEACH and treated with water, the remaining portion of Y+RE extracted liquor from the first acid leach and strong sulfuric acid to dissolve residual phosphate, yttrium and rare earth values. After completion of leaching, the mixture is transferred to the FILTER and the tailings (gypsum and insolubles) are separated and discarded. The leach solution is processed for recovery of yttrium and rare earth values in a second Y+RE EXTRACTOR, and then sent through an optional DEFLUORINATOR back to the FIRST STAGE LEACH. A stripper is shown, which can be employed to recover Y and RE values from the solvent extracts.

Figure 2:
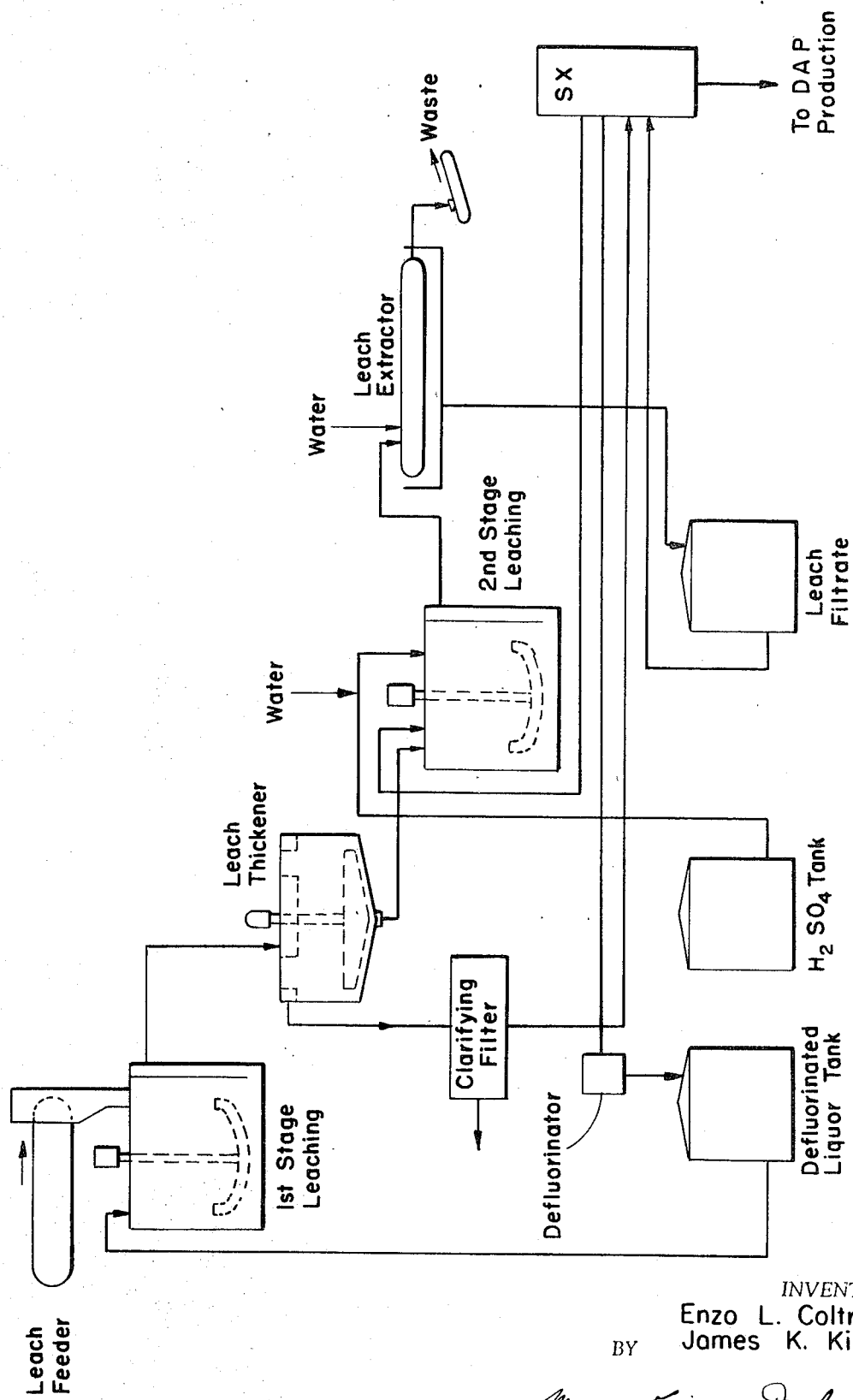
FIG. 2. is a flowsheet illustrating the process of the invention showing semischematically the equipment used to carry the initial feed of apatite concentrate through leaching, filtration and recovery of the valuable constituents from the first and second leach solution.

The process will be described more specifically with reference to a specific embodiment and FIG. 2. As is shown in FIG. 2. the crushed solid materials are fed to the first stage leaching tank where they are mixed and agitated with a solution containing a considerable quantity of dissolved phosphates and excess sulfuric acid for from about 4 to 6 hours, at about 30°–35° C. to produce a first acid leach solution. The mixture then is transferred to a leach thickener tank from where the overflow rich in phosphates and yttrium is removed, transferred to a clarifying filter and then to solvent extraction equipment (SX) where the metal values are extracted with one portion to be subsequently utilized in the second stage leach and the remainder sent to phosphate recovery. The underflow from the leach thickener tank, having a solids content of about 50 percent is transferred to second stage leaching where the slurry, still containing appreciable phosphate values is agitated and water, a portion of the (SX) extracted liquor from the first stage leach described above, and strong sulfuric acid are added to dissolve residual phosphate and other values. This stage requires about 4–6 hours at 30°–35° C. and the preferable pH is low, e.g., 0.02 to 0.25. The material is transferred to a leach extractor with the tailings being discarded as waste. The extract is transferred to a solvent extractor processing equipment (SX) and the metal values are removed: The Y and RE extracted liquor is then transferred to the first stage leach after passing through an optional defluorinator.

DESCRIPTION OF THE PREFERRED EMBODIMENTS

The following example illustrates the process of the instant invention.

EXAMPLE

An aqueous solution (pilot plant leach liquor) that contained 123 g./l. phosphate as $P_2O_5$, 1.6 g./l. yttrium (Y), 8.3 g./l. fluoride (F) and had a pH of 0.25 was solvent extracted (with 15 percent by volume di-2-ethylhexyl phosphoric acid—85 percent by volume kerosene, two stages, phase ratio o/a, 1.5/1, 10 minutes contact); the raffinate contained 122 g./l. $P_2O_5$, 0.004 g./l. Y, 8.5 g./l. F and had a pH of 0.22. The fluoride analysis of the solution was lowered from 8.5 g./l. to 4.0 g./l. by addition of sodium nitrate ($NaNO_3$) and a solid and liquid separation made.

The aqueous solution from the above steps was then combined with a ground apatite flotation concentrate that contained 21.3 percent by weight of $P_2O_5$ and 0.76 percent yttrium (Y) in a first stage leach and the slurry was agitated for 6 hours at 30°–35° C. and 18.9 percent solids.

A solid and liquid separation was made and the resulting solution contained 134 g./l. $P_2O_5$, 0.66 g./l. Y, 4.8 g./l. F and had a pH of 0.73; this solution was solvent extracted for Y and rare earths (three stages, above conditions) and after extraction the aqueous solution contained 133 g./l. $P_2O_5$, 0.004 g./l. Y, 4.6 g./l. F and had a pH of 0.63. Part of the phosphate is recovered. The residue from this first acid leach solids and liquid separation contained 14.2 percent $P_2O_5$ and 0.35 percent Y.

These solids, residue from the first leach, were then releached in a second stage with an aqueous solution, composed of black acid, water and aqueous solution from the first acid leach after the same was solvent extracted to remove the yttrium rare earths, pH 0.05, for 6 hours at 30°–35° C. A solid and liquid separation was made on this second, strong acid leach and the residue or tailings contained only 1.93 percent $P_2O_5$ and 0.10 percent Y. The aqueous strong acid leach liquor contained 126 g./l. $P_2O_5$, 0.84 g./l. Y, 6.8 g./l. F and had a pH of 0.05. This can be recycled into the first stage leach after being solvent extracted and defluorinated as described above.

The combined phosphate recovery was 89.1 percent and the Y recovery was 84.2 percent.

The acid consumed, black sulfuric, was 2.6 pounds (100 percent $H_2SO_4$) per pound $P_2O_5$ dissolved from the apatite flotation concentrate or 2.3 pounds (100 percent $H_2SO_4$) per pound $P_2O_5$ contained.

In contrast to these results, a single-stage leaching process, not according to this invention, in which a more expensive, pure white acid was used, required an acid consumption of 2.9 pounds (100 percent $H_2SO_4$)/pound $P_2O_5$ dissolved or 2.7 pounds ($H_2SO_4$)/pound contained in the concentrate.

In a similar, single-stage leaching process substituting the inexpensive black sulfuric acid used above, the acid consumption requirements increased substantially, to 3.5 pounds (100 percent $H_2SO_4$) per pound $P_2O_5$ dissolved or 3.3 pounds (100 percent $H_2SO_4$)/pound $P_2O_5$ contained.

It can thus be seen that carrying out the process in accordance with the present invention provides a simple easy and economic technique for obtaining a high recovery of phosphate and yttrium and rare earth values from an apatite concentrate. In accordance with this invention from 80 to 95 percent of the phosphate and from 80 to 90 percent of the yttrium values may be recovered from the apatite concentrates.

While the invention is useful in connection with processing apatite concentrates and ores, it may also be used in processing various other rare earth ore concentrates which correspond generally to apatite ores.

In view of the foregoing disclosure, the process of the invention can be carried out according to the example and disclosure set forth above or with such variation and modification as will be readily apparent to those skilled in the art.

Since certain changes may be made in carrying out the above method without departing from the scope of the invention, it is intended that all matter contained in the above description should be considered as illustrative and not as limiting in any sense.

We claim:

1. In a two-stage, countercurrent process for recovering phosphates, yttrium and rare earth metal values from a solid material, the steps comprising
   a. leaching said material with an aqueous solution containing dissolved phosphate and excess sulfuric acid in an amount sufficient to produce a first acid leach solution containing phosphate and yttrium values from said material and separating said first acid leach solution from the leached residue;
   b. leaching the residue from step (a) with water and sulfuric acid in an amount sufficient to produce a second acid leach liquor with a pH of about 0.02 to about 0.25 containing the residual phosphate, residual yttrium and rare earth values from said material and separating said second acid leach solution from the leached residue;
   c. recovering the yttrium and rare earth values from the second acid leach liquor from step (b), by contacting said leach liquor with an organic immiscible solvent therefor which comprises a suitable amine or alkyl phosphate dissolved in an oil or hydrocarbon solvent, so that during recycling of said second acid leach liquor into step (a), the solubility of the yttrium and rare earth salts will not be exceeded but the phosphate content of the solution will be raised to a level sufficient to permit extraction of the phosphate; separating the resulting organic phase containing yttrium and rare earth metal values from the aqueous acid phase and recycling the aqueous acid phase to step (a); and
   d. extracting the yttrium and rare earth values from the first acid leach liquor from step (a) by contacting said leach liquor with an organic immiscible solvent therefor which comprises a suitable amine or alkyl phosphate dissolved in an oil or hydrocarbon solvent, separating the organic phase from the aqueous phase, dividing the aqueous phase and sending one portion for recovery of the contained phosphate and the other portion to the second stage leach, step (b).

2. A process as defined in claim 1 wherein said solid material is an apatite concentrate.

3. A process as defined in claim 1 wherein said solid material comprises apatite tailings from a magnetite iron ore concentration process which have been concentrated subsequently by flotation to contain by analysis from about 15 to about 25 percent $P_2O_5$ and from about 0.25 to about 1.5 percent of yttrium.

4. A process as defined in claim 1 wherein the sulfuric acid used in step (b) is an impure, black acid containing organic residues formed by contacting petroleum fractions with substantially organic residue-free sulfuric acid.

5. A process as defined in claim 1 including the step of defluorinating said aqueous acid phase prior to recycling step (a).

6. A two-stage, countercurrent process for recovering phosphates, yttrium and rare earth values from an apatite-containing solid material comprising
   a. leaching said material with a solution containing dissolved phosphate and excess sulfuric acid, at a temperature of from about 30° to about 35° C., to produce a first acid leach solution of pH about 0.7 containing phosphate and yttrium values from said material, thickening and then separating said first acid leach solution from the leached residue;
   b. leaching the thickened residue from step (a) with an aqueous solution containing sulfuric acid at a temperature of from about 30° to about 35° C. to produce a second strong acid leach solution of pH about 0.05 containing the residual phosphate, yttrium and rare earth values, filtering said second, strong acid leach solution from the leached residue and discarding said residue;
   c. solvent-extracting a portion of the yttrium and rare earth values from the second, strong acid leach solution of step (b) by contacting said leach liquor with an organic immiscible solvent therefor which comprises a suitable amine or alkyl phosphate dissolved in an oil or hydrocarbon solvent, separating the resulting organic phase containing yttrium and rare earth metal values from the aqueous acid phase, defluorinating and recycling the aqueous acid phase into step (a); and
   d. solvent-extracting the yttrium and rare earth values from the first acid leach solution from step (b) by contacting said leach liquor with an organic immiscible solvent therefor which comprises a suitable amine or alkyl phosphate dissolved in an oil or hydrocarbon solvent, separating the organic phase from the aqueous phase, dividing the aqueous phase into two extracted portions, and using the first portion as part of said aqueous solution in step (b) and recovering the phosphates from the second extracted portion.

7. In a two-stage, countercurrent process for recovering phosphates, yttrium and rare earth metal values from apatite, the steps comprising
   a. leaching said material with an aqueous solution containing dissolved phosphate and excess sulfuric acid in an amount sufficient to produce a first acid leach solution containing phosphate and yttrium values from said material and separating said first acid leach solution from the leach residue;
   b. leaching the residue from step (a) with water and sulfuric acid in an amount sufficient to produce a second acid leach liquor with a pH of about 0.02 to about 0.25 containing the residual phosphate, residual yttrium and rare earth values from said material and separating said second acid leach solution from the leached residue;
   c. recovering the yttrium and rare earth values from the second acid leach liquor from step (b), by contacting said leach liquor with an organic immiscible solvent therefor which comprises a suitable amine or alkyl phosphate dissolved in an oil or hydrocarbon solvent, so that during recycling of said second acid leach liquor into step (a), the solubility of the yttrium and rare earth salts will not be exceeded but the phosphate content of the solution will be raised to a level sufficient to permit extraction of the phosphate; separating the resulting organic phase containing yttrium and rare earth metal values from the aqueous acid phase and recycling the aqueous acid phase to step (a); and
   d. extracting the yttrium and rare earth values from the first acid leach liquor from step (a) by contacting said leach liquor with an organic immiscible solvent therefor which comprises a suitable amine or alkyl phosphate dissolved in an oil or hydrocarbon solvent, separating the organic phase from the aqueous phase, dividing the aqueous phase and sending one portion for recovery of the contained phosphate and the other portion to the second stage leach, step (b).

* * * * *